US010323538B2

(12) United States Patent
Lemaitre et al.

(10) Patent No.: US 10,323,538 B2
(45) Date of Patent: Jun. 18, 2019

(54) METHOD FOR SECURING THE OPERATION OF A TURBOMACHINE

(71) Applicant: SAFRAN AIRCRAFT ENGINES, Paris (FR)

(72) Inventors: Alban Lemaitre, Vernon (FR); Serge Le Gonidec, Vernon (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 351 days.

(21) Appl. No.: 14/379,921

(22) PCT Filed: Feb. 19, 2013

(86) PCT No.: PCT/FR2013/050339
§ 371 (c)(1),
(2) Date: Aug. 20, 2014

(87) PCT Pub. No.: WO2013/124578
PCT Pub. Date: Aug. 29, 2013

(65) Prior Publication Data
US 2015/0030464 A1    Jan. 29, 2015

(30) Foreign Application Priority Data

Feb. 20, 2012    (FR) .................................... 12 51531

(51) Int. Cl.
*F02C 9/00*    (2006.01)
*F02K 9/48*    (2006.01)
(Continued)

(52) U.S. Cl.
CPC .......... *F01D 21/003* (2013.01); *F01D 17/06* (2013.01); *F01D 17/08* (2013.01); *F01D 17/085* (2013.01);
(Continued)

(58) Field of Classification Search
CPC .................. F04B 2203/00; F04B 47/04; F04B 2203/0207; F04B 2203/0209; F04D 13/04;
(Continued)

(56) References Cited

U.S. PATENT DOCUMENTS 3,106,062 A * 10/1963 Chipouras ................. F02C 9/00
                                                        60/39.281
3,729,928 A *  5/1973 Rowen ....................... F02C 9/32
                                                        416/30
(Continued)

FOREIGN PATENT DOCUMENTS

EP          1 918 530         5/2008
WO          2007 033914       3/2007
WO     WO 2007033914 A1 *     3/2007    ............. F01D 17/06

OTHER PUBLICATIONS

U.S. Appl. No. 14/379,921—ESpaceNettrans—Full—Translation of WO 2007/033914 A1.*
(Continued)

*Primary Examiner* — Alexander B Comley
(74) *Attorney, Agent, or Firm* — Oblon, McClelland, Maier & Neustadt, L.L.P.

(57) ABSTRACT

A method of making safe operation of a rotary assembly of a turbomachine including a turbine and a rotary machine, the method anticipating an event of exceeding a predetermined threshold speed by repetitively performing a prediction cycle including: measuring magnitudes relating to operation of the turbomachine, including real speed of rotation of its rotary assembly; based on the magnitudes, estimating driving and resisting torques applied to the rotary assembly; preparing a representative value representative of the difference between these two torques; and calculating a predicted speed of rotation for the rotary assembly at a given time horizon based on the representative value and the real (Continued)

speed of rotation. An action is taken on the operation of the turbomachine to limit an extent to which its rotary assembly exceeds the threshold speed in the event of the predicted speed of rotation exceeding the threshold speed.

12 Claims, 3 Drawing Sheets

(51) Int. Cl.
*F01D 17/06* (2006.01)
*F01D 17/08* (2006.01)
*F01D 21/00* (2006.01)
*F04D 13/04* (2006.01)
*F04D 15/00* (2006.01)

(52) U.S. Cl.
CPC ............... *F02C 9/00* (2013.01); *F02K 9/48* (2013.01); *F04D 13/04* (2013.01); *F04D 15/0066* (2013.01); *F05D 2260/80* (2013.01); *F05D 2260/821* (2013.01); *F05D 2270/021* (2013.01); *F05D 2270/304* (2013.01); *F05D 2270/44* (2013.01)

(58) Field of Classification Search
CPC .... F04D 15/0066; F04D 25/045; F04D 13/06; F01D 17/085; F01D 17/08; F01D 17/06; F01D 21/00–21/003; F01D 21/12–21/14; F01D 17/105; F02C 9/00; F02C 9/28; F05D 2270/304; F05D 2270/44; F05D 2270/021; F05D 2270/1011; F05D 2260/821; F05D 2260/80; F02K 9/48
USPC ......... 417/2, 42, 44.1, 44.11, 45; 73/112.01, 73/862.16, 114.17, 165; 324/207.25, 160, 324/166; 702/142, 145, 41; 60/39.282; 415/118

See application file for complete search history.

(56) References Cited

U.S. PATENT DOCUMENTS

| | | | | |
|---|---|---|---|---|
| 4,150,566 A * | 4/1979 | Loebel | ..................... | G01L 3/109 73/862.328 |
| 4,463,564 A * | 8/1984 | McInerney | ........... | F01D 17/105 137/892 |
| 4,473,998 A * | 10/1984 | King | ........................ | F01D 21/04 415/118 |
| 4,712,372 A * | 12/1987 | Dickey | ................... | F01D 21/02 324/160 |
| 4,850,193 A * | 7/1989 | Kawamura | .............. | F02B 37/10 60/608 |
| 5,051,918 A * | 9/1991 | Parsons | ................. | F04D 27/001 415/17 |
| 5,067,355 A * | 11/1991 | Witte | ....................... | G01L 3/109 73/112.01 |
| 5,095,269 A * | 3/1992 | McNinch, Jr. | .......... | G01P 3/489 324/166 |
| 5,133,189 A * | 7/1992 | Hurley | .................... | F01D 21/20 60/646 |
| 5,292,225 A * | 3/1994 | Dyer | ....................... | F01D 21/18 415/29 |
| 5,347,857 A * | 9/1994 | Mirhakimi | .............. | F02B 77/08 73/115.01 |
| 5,363,317 A * | 11/1994 | Rice | ........................ | B64D 31/12 701/100 |
| 5,987,888 A * | 11/1999 | Weisman, II | ......... | F02B 37/007 123/436 |
| 6,321,525 B1 * | 11/2001 | Rogers | .................... | F01D 17/06 60/39.281 |
| 6,401,446 B1 * | 6/2002 | Gibbons | .................. | F02C 9/38 60/39.281 |
| 6,450,044 B1 * | 9/2002 | Eisenhauer | ............. | G01L 5/221 73/862.193 |
| 6,494,046 B1 * | 12/2002 | Hayess | ................... | F01D 21/00 60/39.091 |
| 7,051,535 B2 * | 5/2006 | Acker | ..................... | B64C 27/14 60/39.282 |
| 8,001,848 B2 * | 8/2011 | White | ..................... | G01L 3/109 73/862.191 |
| 8,127,525 B2 * | 3/2012 | Bart | ....................... | F01D 21/006 415/9 |
| 8,224,552 B2 * | 7/2012 | Van Vactor | ............... | F02C 9/46 60/204 |
| 8,321,119 B2 * | 11/2012 | Van Vactor | ............... | F02C 9/46 244/62 |
| 8,352,149 B2 * | 1/2013 | Meacham | ............. | F01D 21/003 701/100 |
| 2005/0066658 A1 * | 3/2005 | Longnecker | ............ | F02D 23/00 60/602 |
| 2005/0193715 A1 * | 9/2005 | Opper | ................... | F01D 21/003 60/39.091 |
| 2008/0101918 A1 * | 5/2008 | Block | ................... | F01D 21/003 415/30 |
| 2008/0276614 A1 * | 11/2008 | Shu | ........................ | F02B 39/16 60/602 |
| 2009/0228117 A1 * | 9/2009 | Le Gonidec | ............... | F02C 9/26 700/9 |
| 2011/0238280 A1 * | 9/2011 | Shibata | ................. | F02D 11/105 701/102 |
| 2012/0180759 A1 * | 7/2012 | Whitney | ............. | F02D 13/0219 123/406.23 |
| 2012/0210694 A1 * | 8/2012 | Holmquist | .............. | F01D 17/04 60/39.091 |
| 2013/0098042 A1 * | 4/2013 | Frealle | .................. | F01D 21/003 60/734 |

OTHER PUBLICATIONS

U.S. Appl. No. 14/379,921—Torque meters—httpweb_archive_org Dec. 27, 2010.*
International Search Report dated Apr. 17, 2013 in PCT/FR13/050339 Filed Feb. 19, 2013.

* cited by examiner

METHOD FOR SECURING THE OPERATION OF A TURBOMACHINE

BACKGROUND OF THE INVENTION

Field of the Invention

The present invention relates to the field of methods of making safe the operation of the rotary assembly of a turbomachine, and in particular of a turbopump, for example a turbopump adapted to be used in the propulsion of a rocket.

More precisely, the present invention relates to a method of making safe the operation of the rotary assembly of a turbomachine, which rotary assembly comprises both a turbine that is caused to rotate by expansion of a drive fluid that is to flow through the turbine, and a rotary machine that is driven mechanically in rotation by the turbine so as to move a driven fluid that is to flow through the rotary machine.

Description of the Related Art

In particular, it may be considered that exceeding a predetermined threshold speed constitutes a major incident in the operation of the turbomachine, in particular in the event of it losing its resisting torque while its turbine continues to be propelled at given power, thereby causing the rotary assembly of the turbomachine to start overspeeding which, in the severest situations, can lead to it exploding.

In the particular circumstance of a turbopump, a sudden drop in resisting torque may be caused by fluid flow in the pump stalling as a result of a change in the flow conditions of the driven fluid that is to flow through the pump.

In particular, it is often necessary to increase the speed of rotation of the pump in order to satisfy a need for flow of the driven fluid. The increase in the flow speed of the driven fluid that results therefrom leads to an increase in the risk of the cavitation phenomenon appearing on the blades of the pump. Unfortunately, the cavitation phenomenon can lead to a significant drop in the resisting torque applied by the pump to the rotary assembly and can thus allow it to start overspeeding.

A conventional method is already known for applying an emergency stop to a turbopump in the event of it starting to overspeed. That conventional method consists in measuring the speed of rotation of the rotary assembly of the turbopump and in tripping the opening of a pyrotechnic valve for diverting the drive fluid, in the event of the measured speed of rotation exceeding a predetermined threshold, which valve is connected in parallel with the turbine, upstream from its inlet.

Thus, in that conventional method, the flow of the drive fluid is diverted from the inlet of the turbine so as to cause a drop in the driving torque applied by the turbine to the rotary assembly of the turbopump, once the pyrotechnic valve has been opened, so that the speed of rotation of the rotary assembly then ceases to increase.

A major drawback of that conventional method is that opening of the pyrotechnic valve is tripped only from an instant subsequent to the instant at which the real speed of rotation of the rotary assembly exceeds the predetermined threshold speed. In other words, opening of the pyrotechnic valve can be tripped only after it has been observed that the real speed of rotation of the rotary assembly has indeed exceeded the predetermined threshold speed.

As a result, there necessarily exists a delay between the instant when the real speed of rotation of the rotary assembly of the turbopump reaches the predetermined threshold speed and the instant at which the pyrotechnic valve is indeed opened. Under such circumstances, although the magnitude of this delay can be minimized by ensuring that the pyrotechnics used for opening the valve are very reactive, the speed of rotation of the rotary assembly continues to increase significantly (and to make matters worse, non-linearly) between the instant at which the threshold speed is exceeded and the instant at which the valve is actually opened. This leads to a major risk of the turbopump absorbing sufficient energy in its inertia to lead to damage when the conventional method is used.

BRIEF SUMMARY OF THE INVENTION

Consequently, there exists an urgent need for a method of making safe to be developed that makes it possible to act more quickly on the operation of a turbomachine in order to limit the extent to which the speed of its rotary assembly exceeds the predetermined threshold speed.

The present invention seeks to provide such a method.

More precisely, the method of an aspect of the present invention comprises a method of making safe the operation of a rotary assembly of a turbomachine, which rotary assembly comprises both a turbine that is caused to rotate by expansion of a drive fluid that is to flow through the turbine, and a rotary machine that is driven mechanically in rotation by the turbine so as to move a driven fluid that is to flow through the rotary machine.

In this method of making safe, the event of the rotary assembly exceeding a predetermined threshold speed is anticipated by repetitively performing a prediction cycle comprising the following steps:
  measuring the following magnitudes during a predetermined time interval:
    a real speed of rotation of the rotary assembly at a given observation instant of said time interval;
    at least one "fluid/turbine interaction" parameter that is representative of the interaction between the turbine and the drive fluid; and
    at least one "fluid/rotary machine interaction" parameter that is representative of the interaction between the rotary machine and the driven fluid;
  estimating the driving torque applied by the turbine to the rotary assembly, on the basis of said real speed of rotation and said at least one "fluid/turbine interaction" parameter;
  estimating, independently of estimating said driving torque, the resisting torque applied by the rotary machine to the rotary assembly, on the basis of said real speed of rotation and said at least one "fluid/rotary machine interaction" parameter;
  preparing a representative value that is representative of the difference between said driving torque and said resisting torque;
  calculating a predicted speed of rotation for the rotary assembly at a prediction instant later than said observation instant on the basis of said real speed of rotation, of said representative value, and of the time difference between the prediction instant and the observation instant; and
  determining that a first condition is satisfied if said predicted speed of rotation exceeds the predetermined threshold speed.

In the method of making safe, an action is taken on the operation of the turbomachine in order to limit the extent to which the speed of its rotary assembly exceeds said threshold speed in the event that, during the prediction cycle, it is determined that at least the first condition is satisfied.

It can be understood that by means of this method of making safe it is possible to calculate a "predicted" speed of rotation that the rotary assembly of the turbomachine will adopt at a future prediction instant that has not yet occurred (i.e. at a prediction instant that is later than the instant during which a real speed of rotation of the rotary assembly of the turbomachine is measured, and that is preferably later than the instant during which it is determined whether the predicted speed of rotation does or does not exceed the predetermined threshold speed).

As a result, it is thus possible to act on the operation of the turbomachine not with a delay relative to the precise instant at which the real speed of rotation of the rotary assembly actually reaches the predetermined threshold speed, but on the contrary in advance of that instant, because it is possible by prediction to anticipate the speed of rotation that the rotary assembly is going to adopt at a future instant.

In other words, by this method of making safe, it is possible to anticipate a predetermined threshold speed being exceeded by acting, during the prediction cycle, to calculate a predicted speed of rotation for the rotary assembly.

In certain implementations, during the prediction cycle, it is determined that the first condition is satisfied if the predicted speed of rotation is greater than the predetermined threshold speed.

It can be understood that the method of making safe as configured in this way makes it possible to anticipate the instant at which the speed of the rotary assembly will exceed a predetermined maximum speed.

Under such circumstances, the method of making safe as configured in this way may be used, for example, to avoid damaging the turbomachine when its rotary assembly starts overspeeding.

For this purpose, it is preferable to select a "high" predetermined threshold speed having a value that is characteristic of starting such overspeeding, and, during the prediction cycle, to determine that the first condition is satisfied if the predicted speed of rotation is greater than this characteristic threshold speed.

In certain implementations, the method of making safe may be used to test the performance limits of the turbomachine, in particular when it is to be mounted on a test bench. It is then possible, optionally, for it to be caused to start overspeeding voluntarily or otherwise. Under all circumstances, the method of making safe serves to prevent the turbomachine being damaged while it is being made to operate up to its design limits.

In certain implementations, during the prediction cycle, it is determined that the first condition is satisfied if the predicted speed of rotation is less than the predetermined threshold speed.

It can be understood that the method of making safe as configured in this way makes it possible to anticipate the instant at which the speed of the rotary assembly is going to become less than a predetermined minimum speed.

Under such circumstances, the method of making safe as configured in this way may be used, for example, to limit the extent to which the speed of rotation of the rotary assembly of the turbomachine accidentally stalls.

For this purpose, it is preferable to select a predetermined "low" threshold speed of value corresponding to a minimum speed of rotation that is acceptable for the rotary assembly of the turbomachine.

In certain implementations, the method of making safe can be used to predict the crossing of lower and/or upper values for a setpoint speed of rotation, and can thus enable the desired speed to be reestablished more quickly.

In certain implementations, said action taken on the operation of the turbomachine comprises causing the turbomachine to make an emergency stop.

In certain implementations, as an alternative or in combination with an emergency stop, said action that is taken may comprise modifying at least the flow rate of the drive fluid at the inlet of the turbine (which modification may be selected to be an increase or a decrease).

It can be understood that it is thus possible to modify (i.e. increase or decrease) the driving torque applied by the turbine to the rotary assembly so as to modify (i.e. increase or decrease) its real speed of rotation.

In certain implementations, it is possible to achieve such a modification in the flow rate by modifying the degree of opening of at least one valve arranged upstream from or in parallel with the inlet of the turbine. It is thus possible to open or close said valve to a greater or lesser extent.

By way of example, it is possible to regulate the flow rate of the drive fluid at the inlet of the turbine, in particular in order to servo-control the speed of rotation of the rotary assembly.

Furthermore, in certain implementations, it is possible to trip at least partial opening (and preferably complete opening) of at least one bypass valve connected in parallel with the inlet of the turbine to reduce the flow rate of the drive fluid at the inlet of the turbine.

It can be understood that when the method of making safe as configured in this way seeks to limit the extent to which the rotary assembly of the turbomachine starts overspeeding, it is possible with the help of such a bypass valve to reduce the driving torque applied by the turbine to the rotary assembly in order to avoid it being damaged. This bypass valve may be opened in anticipation at an instant that is earlier than the instant at which the real speed of rotation of the rotary assembly reaches the predetermined threshold speed.

In certain implementations, the bypass valve is a pyrotechnic valve with its opening (preferably complete opening) being tripped by pyrotechnics in order to minimize the reaction time of the valve (i.e. the time that elapses between the instant at which an order is given to open the bypass valve and the instant at which said valve is indeed in an open state).

In certain implementations, it is possible during the prediction cycle to determine whether a second condition is or is not satisfied as a function of particular operating conditions of the turbomachine.

In particular, in certain implementations, it is possible, during the prediction cycle, to determine that a second such condition is satisfied in the event that the turbomachine is not operating under transient conditions.

In certain implementations, said action on the operation of the turbomachine may be taken if, during the prediction cycle, it is determined that at least the first and the second conditions are both satisfied.

It can be understood that it is thus possible to avoid performing said action in untimely manner when the turbomachine is operating under transient conditions (e.g. not operating under steady conditions), in particular during starting and stopping stages during which the value calculated for the predicted speed is relatively inaccurate because the driving and resisting torques vary rapidly during these stages.

In certain implementations, during the prediction cycle, in order to prepare a representative value that is representative of the difference between the driving torque and the resisting torque, at least one of the estimated driving and resisting torques is corrected in order to attenuate measurement noise associated with the measured magnitudes.

In particular, in certain implementations, it is possible to perform filtering on at least one of the estimated driving and resisting torques on the basis of prior knowledge about the noise characteristics of the measured magnitudes.

In certain implementations, such filtering may be frequency filtering, in particular of the lowpass type, preferably using a cutoff frequency that is selected as a function of frequencies that are characteristic of the noise associated with the measured magnitudes.

In certain implementations, it is possible, for example, to select to use digital filtering (in particular recursive filtering), or any other type of filtering, provided only that such filtering is capable of attenuating the measurement noise associated with the measured magnitudes.

In certain implementations, either as an alternative or in combination with the above-described correction, it is possible to attenuate the value bias that exists between the driving torque and the resisting torque as a result of them being estimated independently of each other, in order, during the prediction cycle, to prepare a more accurate representative value that is representative of the difference between the driving torque and the resisting torque.

The term "estimated independently of each other" is used to mean that the estimates of the driving and resisting torques are made on the basis respectively of first and second estimation models that are decorrelated from each other, at least in part, and for example that are completely decorrelated.

Such at least partial decorrelation may for example result from the fact that at least one measured "fluid/turbine interaction" parameter is used exclusively for estimating the driving torque, whereas at least one measured "fluid/rotary machine interaction" parameter is used exclusively for estimating the resisting torque.

This at least partial decorrelation between the models for estimating the driving and resisting torques can serve to limit the presence of systematic noise in the prepared value representative of the difference between these two torques.

In contrast, as a result of such decorrelation, at a speed of rotation of the rotary assembly that is substantially constant, the value estimated for the driving torque may differ from the value estimated for the resisting torque even though in reality they are substantially identical. This unwanted difference between the values constitutes a value bias that results from the fact that the driving and resisting torques are estimated independently of each other.

In certain implementations, it is possible to perform filtering either on the calculated torque difference between the driving torque and the resisting torque, or on a value derived from the estimated driving torque, or on a value derived from the estimated resisting torque, in order to obtain a value representative of the torque difference in which the value bias is attenuated.

In certain implementations, such filtering may be frequency filtering, in particular highpass type filtering, e.g. so that the passband of the correction for this value bias is slow relative to the dynamics of the speed of rotation of the rotary assembly of the turbomachine, in particular the dynamics of its starting overspeeding.

In certain implementations, it is possible for example to use digital filtering (in particular recursive filtering) or any other type of filtering, provided only that such filtering is capable of attenuating the value bias that is introduced by estimating the driving and resisting torques as a result of them being estimated independently of each other.

In certain implementations, in particular with the help of a tracking filter, it is possible to perform filtering on one of the estimated driving and resisting torques in such a manner as to cause said one of the two torques to converge towards the other of the two torques, thereby enabling the value bias to be diminished when subsequently calculating their difference. It is possible to use an integrator for this purpose.

Furthermore, in certain implementations, the two above-described corrections may be performed in combination with each other during the prediction cycle in order to prepare said representative value.

In particular, in certain implementations, it is possible to correct the driving torque and the resisting torque in order to attenuate the measurement noise associated with the measured magnitudes, and then the difference is calculated between the corrected driving torque and the corrected resisting torque, and then this difference is corrected in order to attenuate said value bias.

In certain implementations, it is possible to correct the driving torque and the resisting torque in order to attenuate the measurement noise associated with the measured magnitudes and then, in particular with the help of a tracking filter, to perform filtering on one of the driving torque and resisting torque as corrected in this way so as to cause said one of the two torques to converge on the other of the two torques, and then calculate the difference between said one of the two torques as filtered in this way and the other one of the two torques.

Furthermore, the model for estimating the driving torque (or the resisting torque as the case may be) is preferably constructed as an empirical relationship that may in particular be prepared from a correspondence table between firstly measured values of the real speed of rotation and of the or each "fluid/turbine interaction" parameter used in the model (or the or each "fluid/rotary machine interaction" parameter, as the case may be), and secondly the behavior of the turbomachine.

In certain implementations, during the prediction cycle, three "fluid/turbine interaction" parameters are measured, consisting respectively in an inlet pressure of the turbine, an outlet pressure of the turbine, and a temperature of the drive fluid at the inlet of the turbine; and the driving torque is estimated on the basis of the real speed of rotation and of these three "fluid/turbine interaction" parameters. It is thus possible to make use of conditions measured at the interfaces of the turbomachine, in particular of its turbine, in order to obtain such "fluid/turbine interaction" parameters that contribute to estimating the driving torque.

In certain implementations, for the purpose of making this estimate, it is possible to construct a driving torque estimation model using parameters obtained during a step of calibrating the method, which step should be performed prior to performing the prediction cycle.

In particular, during this calibration step, it is possible to measure firstly the driving torque (e.g. with a torque meter), and secondly the values taken on by other parameters for each driving torque as measured in that way (in particular, the values taken on for each of the following parameters: a real speed of rotation of the turbomachine; a pressure of the drive fluid at the inlet of the turbine; a pressure of the drive fluid at the outlet of the turbine; and a temperature of the drive fluid at the inlet of the turbine).

Thereafter, during the calibration step, it is possible to prepare an empirical relationship giving the driving torque as a function of said other parameters, using a correspondence table between the various value readings as measured beforehand.

This empirical relationships may then be used as a model for estimating the driving torque when performing the prediction cycle of the method of making safe.

Opting for an empirical model can make the torques estimated during the prediction cycle more accurate, and each given turbomachine can thus benefit from its own empirical relationships, which then take account of its own specific technical features.

Furthermore, opting for an empirical model can serve to make estimating torques during a prediction cycle of the method simpler and less expensive in terms of calculation capacity.

In certain implementations, the method serves to make safe the operation of the rotary assembly of a turbopump as the turbomachine, said rotary assembly comprising said turbine and a pump as the rotary machine.

Without going beyond the ambit of the present invention, it is nevertheless possible to make provision for applying said method of making safe to any other type of turbomachine, provided only that it is possible to estimate the driving and resisting torques applied to its rotary assembly (e.g. and in non-limiting manner with at least one electric motor) in order to be able to calculate a predicted speed of rotation of the rotary assembly and then act on the operation of the turbomachine when said predicted speed of rotation exceeds a predetermined threshold speed.

In particular, in certain implementations, said method makes safe the operation of the rotary assembly of a turbocompressor as the turbomachine, said rotary assembly comprising said turbine and a compressor as the rotary machine.

Furthermore, in certain implementations, when the turbomachine is a turbopump, it is possible during the prediction cycle to measure a flow rate of the driven fluid at the inlet to the pump as a "fluid/rotary machine interaction" parameter; and to estimate the resisting torque on the basis of the real speed of rotation and of the measured flow rate.

It is thus possible to make use of measurements of the conditions at the interfaces of the turbopump, in particular of its pump, in order to obtain such "fluid/rotary machine interaction" parameters that contribute to estimating the resisting torque.

It can also be understood that it is thus possible to prepare a model for estimating the resisting torque, preferably an empirical model, that is simple and inexpensive in calculation capacity.

In particular, in certain implementations, during the above-mentioned calibration step, it is possible to measure both the resisting torque (e.g. with the help of a torque meter) and also the values adopted by other parameters for each resisting torque as measured in that way (in particular the values adopted for each of the following two parameters: a real speed of rotation of the turbomachine; and a flow rate of the driven fluid at the inlet of the pump).

Furthermore, during the calibration step, it is possible to prepare an empirical relationship giving the resisting torque as a function of said other parameters, on the basis of a correspondence table between the various value readings as measured beforehand.

BRIEF DESCRIPTION OF THE SEVERAL VIEWS OF THE DRAWINGS

This empirical relationship may then be used during the prediction cycle of the method of making safe as a model for estimating the resisting torque.

Furthermore, in certain implementations, the rotary machine of the rotary assembly may be directly engaged with the turbine so as to simplify the structure of the turbomachine and reduce its weight.

Figure 1:
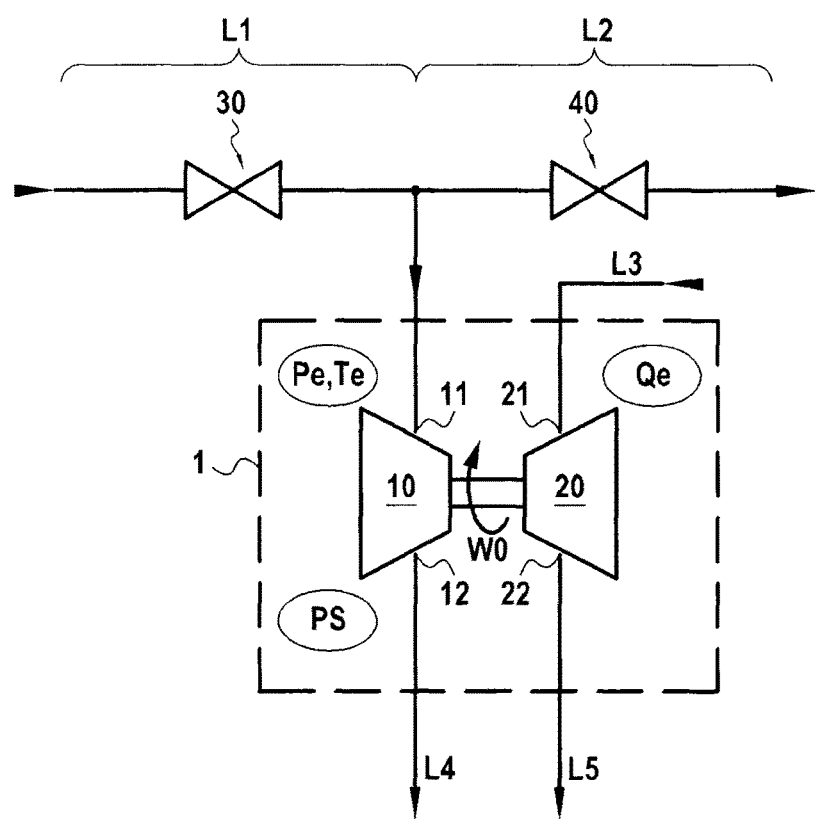
Figure 2:
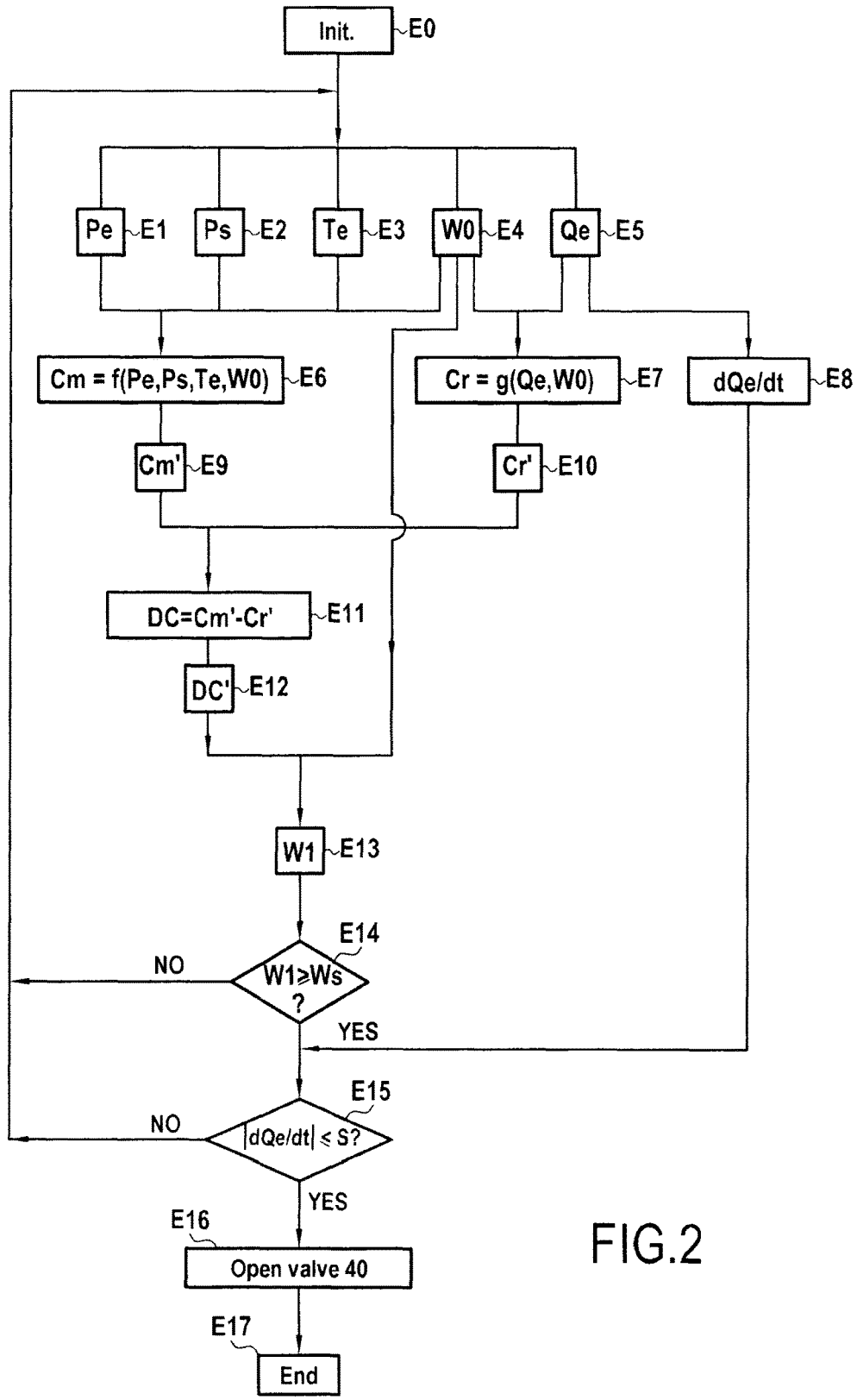
Figure 3:
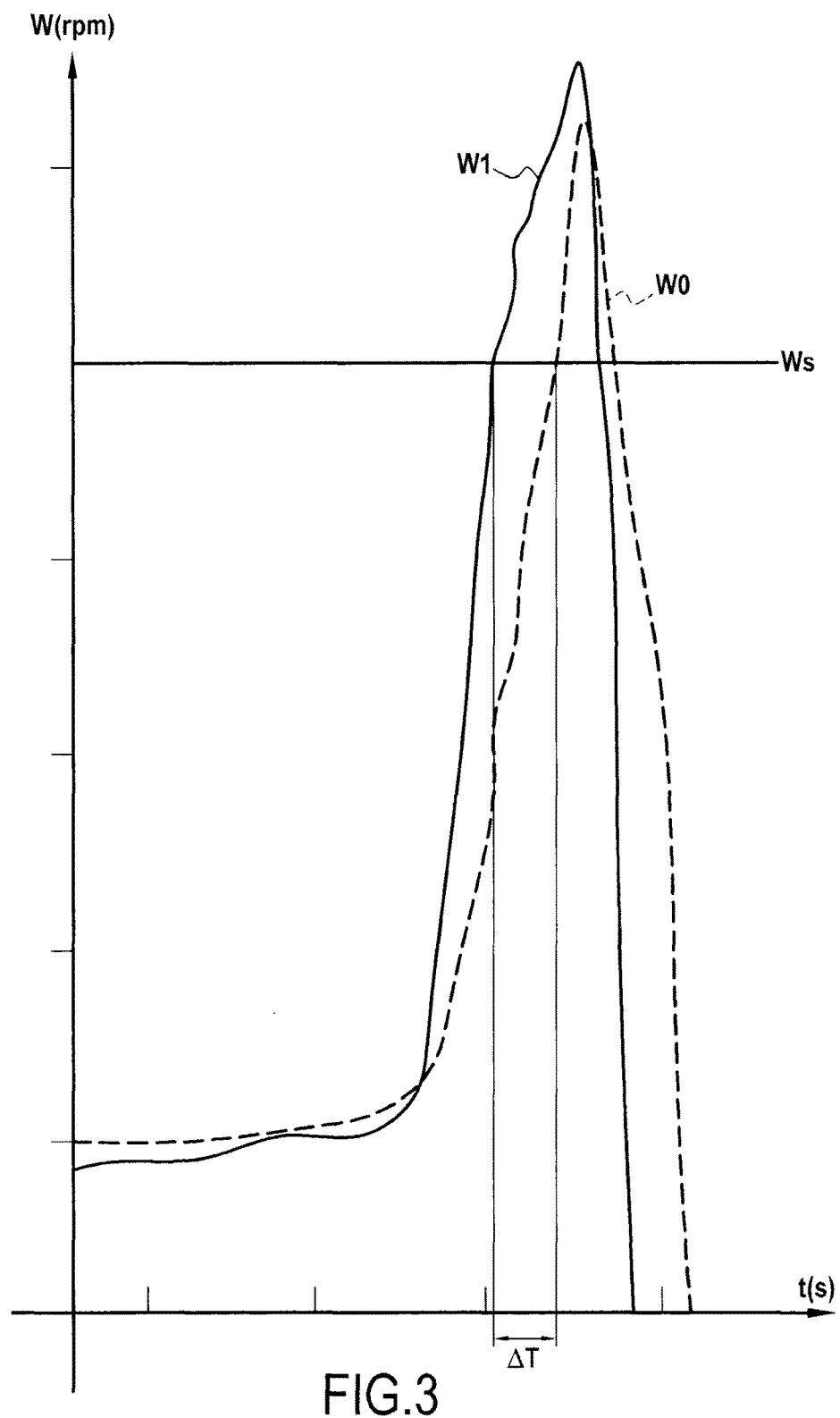

The invention can be better understood and its advantages appear better on reading the following detailed description of embodiments given as non-limiting examples. The description refers to the accompanying drawings, in which:

FIG. 1 is a diagrammatic view of an installation including a turbopump having a rotary assembly to which a method of making safe in accordance with the invention is applied;

FIG. 2 is a flow chart showing an implementation of the method of making safe; and FIG. 3 is a graph showing how the crossing of a predetermined threshold speed is determined by anticipation.

DETAILED DESCRIPTION OF THE INVENTION

In the embodiment shown in particular in FIG. 1, a method of making safe in accordance with the present invention enables the operation of the rotary assembly of a turbopump 1 to be made safe.

In this example, the rotary assembly of the turbopump 1 comprises both a turbine 10 that is caused to rotate by expansion of a drive fluid that is to flow through the turbine 10, and a pump 20 that is driven mechanically in rotation by the turbine 10 so as to move a driven fluid that is to flow through the pump 20.

In this example, drive fluid supply and discharge lines L1 and L4 are connected respectively to the inlet 11 and to the outlet 12 of the turbine 10 so that the drive fluid can flow through the turbine 10 in order to propel it.

Furthermore, a drive fluid bypass line L2 is connected to the supply line L1 so that the inlet 11 of the turbine 10 is arranged in parallel with the bypass line L2 for bypassing the supply line L1.

Furthermore, driven fluid supply and discharge lines L3 and L5 are connected respectively to the inlet 21 and to the outlet 22 of the pump 20 so that the driven fluid can flow through the pump 20 in order to be moved thereby.

In this example, provision is made for the drive fluid to be of a composition that is different from that of the driven fluid, but if this were not so that would not go beyond the ambit of the present invention, for example a stream originating from a single fluid could be divided in two in order to constitute a firstly a drive fluid for the turbine and secondly a fluid driven by the rotary machine (in particular by the pump).

Furthermore, the turbopump 1 in this example is for participating in the operation of a rocket engine, in particular by constituting a subsystem of the rocket engine.

For this purpose, the supply line L1 is connected to the outlet of a gas source, which may come either from a volume of expanded gas or else from a gas generator (not shown in FIG. 1) of the rocket engine. A gas generator may be fed at its inlets with liquid hydrogen and oxygen, and it may deliver at its outlet a mixture of gas at high pressure as a drive fluid used for causing the turbine 10 to rotate.

After expanding in the turbine 10, the gas mixture is directed via the discharge line L4 to the diverging cone of the rocket engine nozzle (not shown).

The propulsion of the turbine 10 that results from this gas mixture expanding serves to drive the pump 20 mechanically in rotation so that the pump pumps a propellant as the driven fluid, either liquid hydrogen or liquid oxygen.

The propellant penetrates into the pump 20 via the supply line L3 and leaves the pump 20 so as to be directed to the combustion chamber (not shown) of the engine via the discharge line L5.

Furthermore, the supply line L1 has a first valve 30 so as to enable the flow rate of the driving fluid at the inlet 11 of the turbine 10 to be varied.

More particularly, the first valve 30 controls and regulates the flow rate of the drive fluid at the inlet 11 of the turbine 10. This valve 30 is used for servo-controlling the speed of rotation of the turbopump 1.

In addition, the bypass line L2 includes a second valve 40.

In this example, the second valve 40 should be completely closed in normal use of the turbopump 1, and should be opened at least in part when it is desired to perform an emergency stop on the turbopump 1 in the event of an anomaly in its operation.

In particular, when the second valve 40 is open at least in part, at least some of the drive fluid coming from the supply line L1 can thus be diverted to a torch (not shown) by the bypass line L2 so as to reduce the flow of drive fluid at the inlet 11 of the turbine 10.

In this example, the second valve 40 is a pyrotechnic valve, such that when its opening is tripped, the second valve 40 opens fully and serves to divert all or nearly all of the stream of drive fluid to the torch, thereby causing the drive torque applied by the turbine 10 to the rotary assembly of the turbopump 1 to drop.

FIG. 2 is a flow chart of a non-limiting implementation of a method for making safe the operation of the rotary assembly of such a turbopump 1.

To begin with, the method of making safe is initialized (initialization step E0 in FIG. 2).

Thereafter, during the method of making safe, a prediction cycle is performed in order to anticipate the rotary assembly of the turbopump 1 exceeding a predetermined threshold speed Ws.

In this example, the prediction cycle begins with measuring the following magnitudes during a predetermined time interval IT:
- an inlet pressure Pe of the drive fluid of the turbine 10 (measurement step E1), this pressure Pe constituting a first of three "fluid/turbine" parameters that are representative of the interaction between the turbine 10 and the drive fluid that is to propel it;
- an outlet pressure Ps of the drive fluid of the turbine 10 (measurement step E2), this outlet pressure Ps constituting another one of the three "fluid/turbine" parameters;
- an inlet temperature Te of the drive fluid of the turbine 10 (measurement step E3), this temperature Te constituting the last of these three "fluid/turbine" parameters;
- a real speed of rotation W0 of the rotary assembly at a given observation instant t0 in said time interval IT (measurement step E4); and
- an inlet flow rate Qe to the pump 20 of the fluid driven thereby (measurement step E5), this flow rate Qe constituting a "fluid/rotary machine" parameter that is representative of the interaction between the pump 20 and the driven fluid.

In order to improve the accuracy of the prediction cycle, it is preferable for the predetermined time interval IT during which each of the above-mentioned measurements is performed to be as short as possible so that the magnitudes Pe, Ps, Te, and Qe are measured at respective instants that are as close as possible to the observation instant t0 when the real speed of rotation W0 is measured (ideally these magnitudes are all measured at the same instant t0).

In addition, in the example shown in FIG. 1, the pump 20 is directly engaged with the turbine 10, such that the speed of rotation of the pump 20 is equal to the speed of rotation of the turbine 10.

Under such circumstances, in order to measure the real speed of rotation W0 of the rotor assembly, it is possible in particular and at the observation instant t0 to measure either a speed of rotation of the pump 20 or a speed of rotation of the turbine 10.

Thereafter, once the above-mentioned measurements have been taken (i.e. once measurement steps E1 to E5 have been performed), the following are estimated during the prediction cycle:
- the driving torque Cm applied by the turbine 10 to the rotary assembly of the turbopump 1 (estimation step E6); and
- the resisting torque Cr applied by the pump 20 to the rotary assembly (estimation step E7).

In this example, the driving torque Cm is estimated from a first empirical relationship f, having as variables the previously measured magnitudes Pe, Ps, Te, and W0:

$$Cm = f(Pe, Ps, Te, W0).$$

Furthermore, the resisting torque Cr is estimated independently of estimating the driving torque Cm on the basis of a second empirical relationship g which is decorrelated from the first and has as its variables the previously measured magnitudes Qe and W0:

$$Cr = g(Qe, W0).$$

Preferably, but not necessarily, the driving torque Cm and the resisting torque Cr are estimated simultaneously during the prediction cycle (i.e. steps E6 and E7 are performed simultaneously).

In addition, estimation of the driving torque Cm and of the resisting torque Cr may be started once the last of the above-mentioned magnitudes has been measured (in particular after the predetermined time interval IT has elapsed).

Furthermore, once the driving and resisting torques Cm and Cr have both been estimated, their difference DC is calculated.

In particular, in this example, corrections are initially applied both to the estimated driving torque Cm and to the estimated resisting torque Cr, and then the torque difference DC is calculated as being the difference between the driving torque Cm' as corrected in this way and the resisting torque Cr' as corrected in this way:

$$DC = Cm' - Cr'$$

More specifically, once the driving torque Cm has been estimated, it is corrected during the prediction cycle in order to attenuate measurement noise associated with the previously measured magnitudes Pe, Ps, Te, and/or W0 (correction step E9). This produces a corrected driving torque Cm'.

Likewise, once the resisting torque Cr has been estimated, it is corrected during the prediction cycle in order to attenuate the measurement noise associated with the previously measured magnitudes Qe and/or W0 (correction step E10). This produces a corrected resisting torque Cr'.

In this example, the driving and resisting torques Cm and Cr are corrected by applying lowpass type frequency filtering to each of these torques with one or more cutoff frequencies that are selected as a function of frequencies characteristic of the noise associated with the corresponding measured magnitudes.

Preferably, but not necessarily, the driving torque Cm and the resisting torque Cr are corrected simultaneously during the prediction cycle (i.e. the steps E9 and E10 are performed simultaneously).

Thereafter, once both the corrected driving torque Cm' and the corrected resisting torque Cr' have been obtained, their difference DC is calculated during the prediction cycle (calculation step E11).

Thereafter, once the torque difference DC has been calculated, a representative value DC' representative of this difference is prepared during the prediction cycle (preparation step E12).

More specifically, the torque difference DC is corrected in order to attenuate the value bias that exists between the driving torque Cm and the resisting torque Cr (and a fortiori between the corrected driving torque Cm' and the corrected resisting torque Cr') resulting from the fact that they are estimated independently of each other.

In particular, filtering is applied to the previously calculated torque difference DC, in particular highpass type frequency filtering, in order to attenuate said value bias.

Once the value DC' representative of the torque difference between the driving torque Cm and the resisting torque Cr has been obtained, a predicted speed of rotation W1 for the rotary assembly at a prediction instant t1 later than the observation instant t0 is calculated during the prediction cycle (calculation step E13). This predicted speed of rotation W1 is calculated from the real speed of rotation W0 as previously measured at the observation instant t0, from the previously prepared representative value DC', and from the time difference t1−t0 between the prediction instant t1 and the observation instant t0.

There are no restrictions concerning the time difference t1−t0 that is selected to define the time horizon t1 that it is desired to use for predicting the speed of rotation W1 of the rotary assembly 1 compared with the observation instant t0 at which the real speed of rotation W0 of the rotary assembly is observed.

Nevertheless, concerning the time difference t1−t0 that is used, it is preferable to find a compromise between either increasing this difference in order to better anticipate the rotary assembly exceeding a predetermined threshold speed Ws, or else decreasing this difference in order to improve the accuracy of the predicted value for the speed of rotation W1 at the prediction instant t1 compared with the speed of rotation that the rotary assembly will actually adopt at the prediction instant t1.

A good compromise between accuracy and detection time is found in particular when this time difference t1−t0 lies for example in the range 1 millisecond (ms) to 25 ms, in particular in the range 5 ms to 20 ms, and in particular is about 10 ms.

Thereafter, once the predicted speed of rotation W1 has been calculated, it is determined during the prediction cycle whether a first condition is or is not satisfied (determination step E14).

In particular, it is determined that this first condition is satisfied if the previously calculated predicted speed of rotation W1 exceeds the predetermined threshold speed Ws.

In the example shown in FIG. 3, the threshold speed Ws is a "high" threshold that is also characteristic of the rotary assembly of the turbopump 1 starting overspeeding.

Under such circumstances, it is determined that the first condition is satisfied if the predicted speed of rotation W1 is greater than the threshold speed Ws.

If it is determined that the first condition is not satisfied (NO in step E14), then the prediction cycle has finished and a new prediction cycle similar to the cycle described above is started.

Otherwise, if it is determined that the first condition is satisfied (YES in step E14), then the prediction cycle continues and during this cycle it is determined whether a second condition is or is not satisfied (determination step E15).

In particular, it is determined that this second condition is satisfied if it is found that the turbopump 1 is not in operating under transient conditions, in particular at least during the prediction cycle, and more specifically at least during the time interval IT during which the above-mentioned magnitudes are measured.

In particular, it is found that transient conditions, such as a stage during which the turbopump 1 is being started or stopped, can be detected by analyzing variations in the flow rate of the driven fluid at the inlet 21 of the pump 20.

More specifically, it is found that variations in this flow rate are much faster during a stage of starting or stopping the turbopump 1 than during a stage in which the pump is operating steadily, and that this applies even when the speed of rotation of the rotary assembly of the turbopump 1 is increasing very quickly during steady operation, as can happen in particular when the rotary assembly starts overspeeding.

In particular, when the rotary assembly starts overspeeding during steady operation, the flow rate at the inlet of the pump 20 can nevertheless vary more slowly than does the speed of rotation.

In the example shown, it is determined that the second condition is satisfied, i.e. it is determined that the turbopump 1 is not operating under transient conditions (and in particular is not being started or stopped) but on the contrary is in steady operation, if the derivative $dQe/dt$ of the flow rate of the driven fluid at the inlet 21 of the pump 20 is, in absolute value, less than a predetermined flow rate variation threshold S.

In the example shown, the derivative $dQe/dt$ of the flow rate is calculated (calculation step E8) on the basis of the flow rate Qe as previously measured during the prediction cycle.

In this example, but not necessarily, this derivative $dQe/dt$ is calculated at the same time as the driving and resisting torques Cm and Cr are being calculated during the prediction cycle (i.e. steps E6, E7, and E8 are performed simultaneously).

Furthermore, after it has been predetermined whether or not the second is satisfied, the prediction cycle comes to an end.

More precisely, if it is determined that the second condition is not satisfied (NO in step E15), then the prediction cycle has come to an end and a new prediction cycle is started similar to the cycle described above.

Otherwise, if it is determined that the second condition is satisfied (YES in step E15), then the prediction cycle has likewise come to an end and thereafter action is taken on the operation of the turbopump 1 to limit the magnitude with which its rotary assembly exceeds the predetermined threshold speed Ws (action step E16).

When the method of making safe reaches step E16, that means that both the first and the second conditions were satisfied during the prediction cycle, and thus that the speed of rotation W1 predicted for the rotary assembly at the prediction instant t1 exceeds the predetermined threshold speed Ws even though the turbopump 1 is normally operating steadily. It is then necessary to act as quickly as possible on the operation of the turbopump 1 so that the speed of rotation that is really adopted by the rotary assembly at the instant t1 exceeds the threshold speed Ws as little as possible.

In the example shown, the action performed on the operation of the turbopump 1 comprises an emergency stop of the turbopump, which is performed by tripping opening of the second valve 40 so as to cause the flow rate of drive fluid at the inlet 11 of the turbine 10 to drop rapidly.

Once this action has been performed, the method of making safe has come to an end (end step E17).

There follows a description in detail of an application of the above-described method of making safe.

In the example, the above-described turbopump 1 was mounted on a test bench in order to test its performance limits.

By way of example, it was decided during a first test stage, to cause the turbopump 1 to operate under steady conditions.

In particular, it was decided to cause the rotary assembly of the turbopump 1 to rotate at substantially constant speed.

That substantially constant speed of rotation was obtained by the first valve 30 servo-controlling said speed by regulating the flow rate of the drive fluid at the inlet 11 of the turbine 10.

Furthermore, during that first stage, the second valve 40 was fully closed so as to direct all of the drive fluid stream to the turbine 10.

It was decided that the substantially constant speed adopted by the rotary assembly during that first test stage should be well below a threshold speed Ws selected to be characteristic of the rotary assembly starting overspeeding.

Under such circumstances, throughout the first test stage, the prediction cycle of the above-described method of making safe was performed repetitively and came to an end on each occasion by determining that the first condition had not been satisfied (NO in step E14).

FIG. 3 is a graph plotting the variation both in the real speed of rotation W0 and in the predicted speed of rotation W1 as a function of time as obtained repetitively during a succession of prediction cycles.

From this graph, it can be seen that the speeds W0 and W1 were substantially equal during the first test stage. The correction step E12 of the prediction cycle, in which the value bias that exists between the driving and resisting torques is attenuated, contributes to obtaining such speeds W0 and W1 that are substantially equal, since this step serves to attenuate the value difference that exists between these two torques resulting from them being estimated independently of each other, which difference ought in theory to be zero when the speed of rotation of the rotary assembly is constant.

Thereafter, after that first test stage, a second test stage was performed during which a cavitation phenomenon was forced to appear on the blades of the pump 20 by changing the flow at the inlet to the pump. The cavitation phenomenon led to the rotary assembly of the turbopump 1 starting overspeeding.

Under such circumstances, and as shown in the graph of FIG. 3, there came a moment when the predicted speed of rotation W1 as calculated during a particular prediction cycle reached the threshold speed Ws.

Since the turbopump 1 was not operating under transient conditions when the threshold speed Ws was reached, that particular prediction cycle came to an end with a YES in step E14 followed by a YES in step E15, causing the opening of the second valve 40 to be tripped in order to limit the extent to which the speed of the rotary assembly of the turbopump 1 exceeded the threshold speed Ws.

As can be seen from the graph in FIG. 3, by performing the method of making safe of the present invention, it was possible to anticipate the instant at which the predicted speed W1 was going to cross the threshold speed Ws relative to the instant at which the threshold speed Ws was indeed crossed by the real speed W0, thereby obtaining an anticipation time $\Delta T$.

For example, the anticipation time $\Delta T$ may lie in the range 100 ms to 200 ms, approximately, thereby enabling opening of the second valve 40 to be tripped in anticipation by a corresponding length of time, and consequently reducing the risk, at the instant at which the valve 40 actually opens, of the rotary assembly being able to store sufficient energy in its inertia to cause damage.

The embodiments and implementations described in the present description are given in illustrative and non-limiting manner, and, in the light of this description, a person skilled in the art can easily modify those embodiments or implementations or can envisage others, while remaining within the ambit of the present invention.

Furthermore, various characteristics of these embodiments or implementations may be used optionally, singly or in combination with one another. When they are combined, these characteristics may be combined as described above or differently, the invention not being limited to the specific combinations described in the present description. In particular, unless specified to the contrary, a characteristic described with reference to a particular embodiment or implementation may be applied in analogous manner to some other embodiment or implementation.

The invention claimed is:

1. A method of ensuring safe operation of a rotary assembly of a turbomachine, wherein the rotary assembly includes a turbine that is caused to rotate by expansion of a drive fluid that flows through the turbine, and a rotary machine that is driven mechanically into rotation by the turbine to move a driven fluid that flows through the rotary machine, wherein an event of the rotary assembly exceeding a predetermined threshold speed is anticipated by repetitively performing a prediction cycle comprising:

measuring the following magnitudes during a predetermined time interval:
 a real speed of rotation of the rotary assembly at a given observation instant of the time interval;
 at least one fluid/turbine interaction parameter that is representative of an interaction between the turbine and the drive fluid; and
 at least one fluid/rotary machine interaction parameter that is representative of an interaction between the rotary machine and the driven fluid;

estimating driving torque applied by the turbine to the rotary assembly, based on the real speed of rotation and the at least one fluid/turbine interaction parameter;

estimating, independently of estimating the driving torque, resisting torque applied by the rotary machine to the rotary assembly, based on the real speed of rotation and the at least one fluid/rotary machine interaction parameter;

preparing a representative value that is representative of a difference between the estimated driving torque and the estimated resisting torque;

calculating a predicted speed of rotation for the rotary assembly at a prediction instant later than the observation instant based on the real speed of rotation, the representative value, and a time difference between the prediction instant and the observation instant; and determining that a first condition is satisfied when the predicted speed of rotation exceeds the predetermined threshold speed, wherein an action is taken on an operation of the turbomachine to limit an extent to which the speed of the rotary assembly exceeds the threshold speed when, during the prediction cycle, it is determined that at least the first condition is satisfied, and said action that is taken comprises modifying at least a flow rate of the drive fluid at an inlet of the turbine.

2. A method according to claim 1, wherein the action that is taken includes an emergency stop of the turbomachine.

3. A method according to claim 1, wherein the flow rate modification is performed by tripping at least partial opening of at least one bypass valve connected in parallel with the inlet of the turbine to reduce the flow rate of the drive fluid at the inlet of the turbine.

4. A method according to claim 1, wherein, during the prediction cycle, it is determined that a second condition is satisfied in the event that the turbomachine is not operating under transient conditions; and wherein the action is taken when, during the prediction cycle, it is determined that at least the first and the second conditions are both satisfied.

5. A method according to claim 4, wherein the second condition is satisfied when a derivative of an inlet flow rate to the rotary machine is greater than a predetermined threshold.

6. A method according to claim 1, wherein, to prepare the representative value during the prediction cycle, at least one of the torques estimated from among the driving torque and the resisting torque is corrected to attenuate measurement noise associated with the measured magnitudes.

7. A method according to claim 1, wherein, to prepare the representative value during the prediction cycle, a value bias that exists between the driving torque and the resisting torque as a result of the driving torque and the resisting torque being estimated independently of each other is attenuated.

8. A method according to claim 7, wherein, to prepare the representative value during the prediction cycle, the driving torque and the resisting torque are corrected to attenuate measurement noise associated with the measured magnitudes, and then the difference is calculated between the corrected driving torque and the corrected resisting torque, and then the difference is corrected to attenuate the value bias.

9. A method according to claim 1, wherein, during the prediction cycle, three fluid/turbine interaction parameters, consisting of an inlet pressure of the turbine, an outlet pressure of the turbine, and a temperature of the drive fluid at the inlet of the turbine are measured, and the driving torque is estimated based on the real speed of rotation and the three fluid/turbine interaction parameters.

10. A method according to claim 1 used to ensure safe operation of the rotary assembly of a turbomachine, the turbomachine including the turbine and a pump.

11. A method according to claim 10, wherein, during the prediction cycle, a flow rate of the driven fluid is measured at an inlet of the pump as the fluid/rotary machine interaction parameter; and the resisting torque is estimated based on the real speed of rotation and the measured flow rate.

12. A method according to claim 1, wherein the time difference between the prediction instant and the observation instant is between 1 millisecond and 25 milliseconds.

\* \* \* \* \*